United States Patent [19]

Janssens et al.

[11] 4,011,352
[45] Mar. 8, 1977

[54] THERMOGRAPHIC PROCESS OF PRODUCING AN IMAGE

[75] Inventors: Wilhelmus Janssens, Aarschot; Raymond Gerard Lemahieu, Mortsel; Jozef Aimé Dierckx, Hove; Daniël Alois Claeys, Mortsel, all of Belgium

[73] Assignee: AGFA-GEVAERT N.V., Mortsel, Belgium

[22] Filed: Nov. 28, 1975

[21] Appl. No.: 635,904

Related U.S. Application Data

[63] Continuation of Ser. No. 428,805, Dec. 27, 1973, abandoned.

[30] Foreign Application Priority Data

Sept. 14, 1973 United Kingdom ............. 43337/73

[52] U.S. Cl. .................... 427/145; 282/27.5; 427/148; 427/150; 427/261; 428/323; 428/332; 428/537; 428/913
[51] Int. Cl.² .......................... B41M 5/12
[58] Field of Search .......... 427/145, 150, 261, 148; 428/332, 323, 307, 913, 537, 477; 282/27.5; 260/240 R, 240 G, 240.7, 240.9, 566 R, 566 F; 96/1

[56] References Cited

UNITED STATES PATENTS

| | | | |
|---|---|---|---|
| 2,929,736 | 3/1960 | Miller et al. ................ | 282/27.5 |
| 3,041,165 | 6/1962 | Sus et al. ................... | 96/1 |
| 3,076,721 | 2/1963 | Coles et al. ................ | 428/537 |
| 3,219,470 | 11/1965 | Lassig ...................... | 428/477 |
| 3,442,682 | 5/1969 | Fukawa ..................... | 428/537 |
| 3,483,013 | 12/1969 | Berg et al. ................. | 428/483 |
| 3,489,565 | 1/1970 | Kohn ........................ | 96/66 |
| 3,594,208 | 7/1971 | Wiese et al. ................ | 428/483 |
| 3,597,211 | 8/1971 | Betts et al. ................. | 96/88 |

FOREIGN PATENTS OR APPLICATIONS

| | | | |
|---|---|---|---|
| 1,297,561 | 5/1962 | France ..................... | 260/566 R |
| 1,427,102 | 12/1965 | France ..................... | 260/566 R |

*Primary Examiner*—Thomas J. Herbert, Jr.
*Attorney, Agent, or Firm*—William J. Daniel

[57] ABSTRACT

A thermographic recording process in which a dye is produced by bringing image-wise into reactive contact with the aid of heat an organic acid-reacting compound with a dye precursor compound corresponding to the following general formula:

$$X = Ar - CH = N - R_1$$

wherein:
Ar represents a bivalent aromatic nucleus,
$R_1$ represents an aryl group and
$X$ represents a

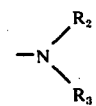

group wherein each of $R_2$ and $R_3$ (same or different) represents an alkyl group, a cycloalkyl group, an aralkyl group, or an aryl group or $R_2$ and $R_3$ together represent the necessary atoms to close a nitrogen-containing heterocyclic nucleus.

12 Claims, No Drawings

THERMOGRAPHIC PROCESS OF PRODUCING AN IMAGE

This is a continuation of Ser. No. 428,805, filed Dec. 27, 1973 and now abandoned.

The present invention relates to heat-sensitive materials suited for the recording and/or reproduction of information and to recording processes wherein such materials are used.

In common thermography a heat-sensitive sheet is brought into face to face contact with a graphic original that carries an image formed of infrared radiation absorbing material. When the original is exposed to infrared radiation, the image portions thereof are heated selectively and cause development in the adjacent heat-sensitive sheet of a colour pattern corresponding to the original Transfer by heat of reactant materials to a receptor sheet has been described, e.g., in the United Kingdom patent specification No. 973,965 filed Sept. 29, 1960 by Minnesota Mining Manufacturing and in the U.S. Pat. No. 2,770,534 of Walter S. Marx, Jr. issued Nov. 13, 1956 and U.S. Pat. No. 3,476,578 of Eric Maria Brinckman issued Nov. 4, 1969

Heat-sensitive copy sheets that change colour when heated and in which the dye-forming reaction is based on the reaction of an acid-reacting compound with a dye precursor compound, have been described in the Dutch Patent Application 64/02,618 filed Mar. 12, 1964 by Allied Chem. Corp.

From the U.S. Pat. No. 3,594,208 of Joseph A. Wiese, Jr. and Donald J. Williams issued July 20, 1971 it is further known to prevent premature reaction between a dye precursor and a proton-producing compound by applying the dye precursor compound in a binder layer different from the binder layer containing an acid. In practice, the acid-containing coating is applied as an outermost layer from a solution in a volatile liquid vehicle, which is a non-solvent for the vinyl chloride polymer acting as binder for the dye precursor, the layer comprising the dye precursor being applied as the first coating to the support.

The dye precursors used in such integral copy sheet having a dual coating are N-bis(p-dialkylaminoaryl)methane derivatives. Many of these derivatives are not completely colourless so that images having a slightly coloured image background are obtained therewith.

An important demand for copying materials intended for projection purposes is the production of highly fade-resistant dye images, i.e. dye images, the dyes of which withstand continuous exposure to light as applied e.g. in an overhead projector.

In the projection of multicolour images there is a special need for light resistant yellow dyes.

There has now been found a thermographic recording process in which essentially yellow azomethine dye salts of good fade resistance are produced by bringing image-wise into reactive contact with the aid of heat an acid-reacting compound with a dye precursor compound corresponding to the following general formula:

$$X - AR - CH = N - R_1$$

wherein:
Ar represents a bivalent aromatic nucleus e.g. phenylene,
$R_1$ represents an aryl group including a substituted aryl group e.g. a phenyl, naphthyl or biphenyl group, substituents of the aryl group being e.g. an alkyl group, an alkoxy group, an alkoxycarbonyl substituted alkoxy group, a sulphonyl substituted alkoxy group, an aryl sulphonuyl substituted alkoxy group, a phenyl carbamoyl substituted alkoxy group, an alkyl mercapto group, an alkylamido group, or halogen e.g. bromine, and
X represents an a

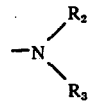

group
wherein each of $R_2$ and $R_3$ (same or different) represents an alkyl group e.g. a $C_1$–$C_5$ alkyl group, a cycloalkyl group, an aralkyl group, or an aryl group including said groups in substituted form or $R_2$ and $R_3$ together represent the necessary atoms to close a nitrogen-containing heterocyclic nucleus e.g. a piperidine, pyrrolidine, or morpholine nucleus.

Representatives of particularly suitable dye precursor compounds are given in the following table.

Table

| No. | Dye precursor compound | Melting point °C |
|---|---|---|
| 1 | H₃C\N-⟨⟩-CH=N-⟨OCH₃⟩-O-CH₂-CH₂-O-⟨⟩ / H₃C | 152 |
| 2 | Cl-CH₂-CH₂\N-⟨⟩-CH=N-⟨⟩-O-(CH₂)₁₀-COOC₂H₅ / Cl-CH₂-CH₂ | 66 |
| 3 | ⟨⟩-⟨⟩-N=HC-⟨⟩-N(CH₃)₂ | 208 |

Table-continued

| No. | Dye precursor compound | Melting point °C |
|---|---|---|
| 4 | (CH₃)₂N—C₆H₄—CH=N—C₆H₄—S—(CH₂)₁₅—CH₃ | 99 |
| 5 | (CH₃)₂N—C₆H₄—CH=N—C₆H₄—O—(CH₂)₁₅—CH₃ | 98 |
| 6 | naphthyl—N=CH—C₆H₄—N(CH₃)₂ | 112 |
| 7 | (CH₃)₂N—C₆H₄—CH=N—C₆H₃(OCH₃)₂ (2,4-dimethoxy) | 145 |
| 8 | C₆H₅—SO₂—CH₂—CH₂—O—C₆H₄—N=CH—C₆H₄—N(CH₃)₂ | 154 |
| 9 | Br—C₆H₄—N=CH—C₆H₄—N(CH₃)₂ | 160 |
| 10 | H₃CO—C₆H₄—N=CH—C₆H₄—N(CH₃)₂ | 140 |
| 11 | 2,6-(C₂H₅)₂-C₆H₃—N=HC—C₆H₄—N(CH₃)₂ | 122 |
| 12 | C₆H₅—NH—CO—CH₂—O—C₆H₄—N=CH—C₆H₄—N(CH₃)₂ | 205 |
| 13 | H₃CO—C₆H₃(CH₃)—N=HC—C₆H₄—N(CH₃)₂ | 120 |
| 14 | (CH₃)₂N—C₆H₄—CH=N—C₆H₃(CH₃)₂ (2,4-dimethyl) | 102 |
| 15 | C₆H₅—N=HC—C₆H₄—N(C₂H₅)(CH₂—CN) | 97 |
| 16 | (Cl—CH₂—CH₂)₂N—C₆H₄—CH=N—C₆H₄—SCH₃ | 114 |

Table-continued

| No. | Dye precursor compound | Melting point °C |
|---|---|---|
| 17 | (H₃C)₂N—C₆H₄—CH=N—C₆H₄—O—(CH₂)₁₀—COOH | 140 |
| 18 | C₆H₅—N=CH—C₆H₄—N(CH₂—COOCH₃)₂ | 112 |
| 19 | C₆H₅—N=CH—C₆H₄—N(CH₂—CH₂—CN)₂ | 142 |
| 20 | C₆H₅—N=CH—C₆H₄—N(CH₃)₂ | 95 |
| 21 | (Cl—CH₂—H₂C)₂N—C₆H₄—CH=N—C₆H₃(OCH₃)₂ | 83 |
| 22 | 1-Naphthyl—N=CH—C₆H₄—N(CH₂—CN)(CH₂—CH₃) | 98 |
| 23 | 1-Naphthyl—N=CH—C₆H₄—N(CH₂—CH₂—CN)₂ | 148 |
| 24 | H₃CO—C₆H₄—CH=N—C₆H₄—N(C₂H₅)₂ | 90 |
| 25 | (NC—CH₂—CH₂)₂N—C₆H₄—CH=N—C₆H₄—N(C₂H₅)₂ | 150 |
| 26 | (H₃C)₂N—C₆H₄—CH=N—C₆H₄—N(C₂H₅)₂ | 140 |
| 27 | H₃C—OC—HN—C₆H₄—N=CH—C₆H₄—N(CH₃)₂ | 215 |
| 28 | H₃CS—C₆H₄—N=CH—C₆H₄—N(CH₃)₂ | 150 |

Table-continued

| No. | Dye precursor compound | Melting point °C |
|---|---|---|
| 29 | | 104 |
| 30 | | 107 |
| 31 | | 140 |
| 32 | | 260 |

The preparation of the dye precursor compound is illustrated by the following reaction scheme:

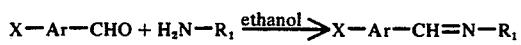

and preparation receipt.

1 mole of the aldehyde and 1 mole of the amine are dissolved whilst heating in 1200 ml to 2800 ml of ethanol. 1 mole of acetic acid is added dropwise to the obtained mixture over a period of 10 min. The reaction mixture is then allowed to boil with reflux for 20 to 60 min. After cooling the precipitate is sucked off and washed with cold ethanol. When necessary the obtained product is recrystallized from methanol or a higher alcohol.

For the preparation of compounds 24 and 26 the acetic acid has been replaced by 3 moles of triethylamine.

The reaction of acid with the above dye precursor compounds results in the production of protonated azomethine dyes with light-absorption maxima that are more bathochromic than in the non-protonated structures.

The above colour precursors are suited for use in a thermographic two-sheet system using a transfer and receptor sheet or for use in an integral copy-sheet containing on a same support the proton donor or acid-supplying reactant out of direct chemical contact from the dye precursor at room temperature (20°-30° C) but in such a condition that reactive contact can be effected through heating at a temperature above 60° C.

Preferably acid reactants are used that evolve a volatile acid or melt at the temperature applied in the thermographic process. In this respect the following reactants are preferred: benzoic acid, succinic acid, citric acid, cyanoacetic acid, gallic acid, salicyclic acid, 5-bromosalicylic acid, a sulfamic acid (i.e. an organic acid of the type $(R'_1.R'_2)-N-SO_2OH$ in which $R'_1$ and $R'_2$ are organic groups), maleic acid, 2,4-dichloromaleic acid, phthalic acid, and the anhydrides of these acids. Further use can be made of the half-esters of bivalent carboxylic acids. These half-esters may be formed in situ in the coating composition by dissolving the corresponding anhydrides in an alcohol, e.g. ethanol. Examples of such half-esters are the monomethyl-, monoethyl- or monoisopropyl esters of tetrachlorophthalic acid.

Particularly suited are mono-esters of aromatic orthocarboxylic acids described in the United Kingdom patent Application 43,336/73 filed Sept. 14, 1973 by Agfa-Gevaert N.V. corresponding to the following general formula:

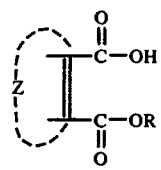

wherein:
Z represents the necessary atoms to close an aromatic nucleus or ring system including such nucleus or ring system in substituted form, e.g. a benzene nucleus and a halogen-substituted benzene nucleus, and
R represents an aliphatic or cycloaliphatic group of at least 4 carbon atoms or an aliphatic group substituted with hydroxyl, an etherified hydroxyl or an acyloxy group.

Acids having a pKa value between 2 and 5 are generally effective.

Examples of salts that are reacting as an acid are monosodium citrate, potassium aluminium sulfate, aluminium sulfate, potassium hydrogen tartrate, sodium hydrogen phosphate, ammonium gallate, ammonium benzoate and dichlorobenzidinedihydrochloride.

The anhydride compounds of succinic acid and of maleic acid and some of the ammonium salts show little proton activity at room temperature, but obtain increased activity at elevated temperatures. Examples of solid prototropic compounds that are useful for the thermographic dye formation of the present invention are saccharine, barbituric acid, and uric acid. These compounds have the property of not being an active proton-donor at room temperature, so that premature colour formation therewith is avoided. In thermographic heating conditions above 60° C they become actively proton-donating.

According to one embodiment of a two-sheet thermographic recording system the dye precursor compound is applied in such a condition to or into a receptor sheet that an acid transferred from a contacting image-wise heated transfer sheet can reach this compound and react therewith to form the desired dye. The dye precursor compound is preferably applied to a support in a binder coating, to which the acid, when heated, can be transferred from the transfer sheet.

Suitable binders for that purpose are vinyl chloride homopolymer and copolymers e.g. vinyl chloride copolymer including from 75 to 95% of vinyl chloride. Copolymers of vinyl chloride monomer and of vinyl acetate monomer are preferred copolymers.

Other copolymers of vinyl chloride e.g. with acrylonitrile are useful likewise. Polymers and copolymers, which as a result of their molecular weight or composition become sticky on heating, have to be avoided since they prevent the easy separation of the transfer sheet from the receptor sheet.

The composition of the receptor sheet coating will usually consist exclusively of non-acidic vinyl chloride polymer or copolymer and the dye precursor compound, though this is not absolutely necessary. Indeed, the receptor coating or an adjacent coating may contain pigments that give an overall colour to the receptor sheet e.g. for obtaining more image contrast.

For example, white pigments or coloured pigments contrasting in colour with the dye image produced may be incorporated too in the receptor sheet. Suitable pigments for that purpose are e.g. titanium dioxide particles. The receptor coating may contain different kinds of fillers or grainy material such as silica particles that e.g. improve the capability of being written on with pencil.

Further it may contain gloss-improving substances and anti-sticking agents, e.g. metal soaps, aluminum stearate being an example thereof.

In the two sheet system good results have been obtained with an amount of dye precursor compound in a ratio of 1 part by weight with respect to 1 to 20 parts by weight of binder.

The support of the receptor sheet is preferably flexible. Any kind of paper or resin support may be used. However, if the adherence of the receptor coating is too low, a suitable subbing layer or layers may be applied to the support. The support has to be transparent for visible light, when the copies obtained with the recording material have to be used for projection e.g. in an overhead projector.

In the mono-sheet system different techniques of keeping the acid reactant and the dye precursor compound out of reactive chemical contact below 60° C may be applied. For example, the reactants are kept out of direct chemical contact by enveloping at least one of the reactants in a capsule or droplet that contains a shell or envelope of a material, normally a polymeric material or wax that prevents the direct contact with the other reactant. The capsule shell or droplet envelope is ruptured or softened by heating, as a result of which the reactants come into reactive contact.

The capsules or droplets containing a first reactant may be dispersed in the paper mass of a paper sheet or in a binder or binder system containing the second reactant in dispersed or dissolved form.

The inner part of the capsule may be of organic non-water-miscible nature and the shell or envelope may contain or consist of a hydrophilic material e.g. hydrophilic polymer or colloid that is hardened optionally. Capsules of this type have been described e.g. in the United Kingdom patent specification Nos. 1,281,492 filed Apr. 19, 1971 by Nat. Cash Register, 1,276,598 filed Aug. 3, 1970 by Fuji Photo Film and 1,034,437 filed Feb. 20, 1963 by Gevaert Photo-Producten N.V.

According to another embodiment the contents of the capsule are hydrophilic. For example the capsule contains water and a first reactant dissolved or dispersed therein. The capsule shell has a hydrophobic nature. The preparation of the latter type of capsules has been described in the United Kingdon Pat. Nos. 1,048,696, 1,048,697 both filed July 10, 1963 by Gevaert Photo-Producten N.V. and 1,298,194 filed Nov. 20, 1968 by Gevaert-Agfa N.V. and in the Belgian Pat. No. 792,550 filed Dec. 11, 1972 by Agfa-Gevaert N.V.

Preferred integral copy sheets applied in the mono-sheet system contain the dye precursor compound and acid reactant out of chemical reactive contact at least below 60° C in apart binder layers, the top layer having been applied from a solution in a volatile liquid, which is a non-solvent for the binder of the subjacent other layer. Premature reaction is avoided effectively when in a first layer on the support of the recording material a vinyl chloride homopolymer or copolymer binder containing the dye precursor compound and being insoluble or poorly soluble in ethanol or methanol is coated and the acid reactant and a polymer that is highly soluble in ethanol e.g. cellulose nitrate or polyvinylacetate are incorporated in a layer bonded to the first layer. Cellulose nitrate containing a small amount e.g. 2% by weight of the copolymer of methyl methacrylate and methacrylic acid is a preferred binder composition for the layer containing the acid reactant. The methacrylic acid content of the copolymer is preferably from 10 to 60% by weight.

Crystallization of the acid reactants in said ethanol-soluble binders may be avoided by incorporation therein of a suitable amount of plasticizer e.g. as described in the U.S. Pat. No. 3,594,208 as mentioned above.

If coated on a removable carrier, the very vinyl polymer film containing the dye precursor compound may serve as the backing but preferably it is permanently supported on a separate heat-resistant film e.g. a polyester resin film, preferably a polyethylene terephthalate film. The ratio of vinyl polymer to dye precursor compound in the single sheet system material may be in the range of about 20 to 3 parts by weight of polymer to 1 part by weight of dye precursor compound.

A preferred acid reactant is phthalic anhydride.

If plasticizers are used in the layer containing the acid reactant preference is given to those that do not opacify the recording material, in other words those that are compatible with the binder e.g. cellulose nitrate. The plasticizer should therefore be soluble in the same solvent as the binder. It should be essentially non-volatile in normal storage conditions. Suitable plasticizers for cellulose nitrate are "Butvar B-76" a polyvinyl butyral, polyalkylene glycol, and camphor.

The following examples illustrate the present invention without, however, limiting it thereto. The percentages and ratios are by weight, unless otherwise indicated.

EXAMPLE 1

A polyethylene terephthalate support of a thickness of 0.10 mm was coated at a ratio of 33 ml per sq.m with the following composition:

| | |
|---|---|
| 7 % solution in methyl ethyl ketone of copolymer of vinyl chloride and vinyl acetate (85/15) | 700 ml |
| 2 % solution in methyl ethyl ketone of the dye precursor compound 1 of the Table | 300 ml |

After drying a second layer was applied at a ratio of 70 ml per sq.m from the following composition:

| | |
|---|---|
| 5 % solution in ethanol of polyvinyl acetate | 500 ml |
| 10 % solution in ethanol of phthalic anhydride (actuallly the ethyl half ester of ortho-phthalic acid is formed in situ) | 50 ml |
| ethanol | 450 ml |

After drying of the second layer at 50° C the resulting transparent recording material was exposed reflectographically to infrared radiation, the second layer being held in direct contact with the infrared absorbing image markings of a printed text paper original. In accordance with the infrared absorbing image markings a yellow dye has been formed in the recording material.

The resulting copy was particularly suited for projection with an overhead projector.

EXAMPLE 2

A polyethylene terephthalate support having a thickness of 0.10 mm was coated at a ratio of 30 ml per sq.m from the following composition:

| | |
|---|---|
| 5 % solution in methyl ethyl ketone of copolymer of vinyl chloride and vinyl acetate (85/15) | 400 ml |
| 2.5 % solution in methyl ethyl ketone of dye precursor compound Nr. 7 | 100 ml |

After drying at 70° C a second coating was applied at a ratio of 20 ml per sq.m from the following composition:

| | |
|---|---|
| 5 % solution in methanol of cellulose nitrate | 400 ml |
| 10 % solution in methanol of polyvinyl butyral | 20 ml |
| 10 % solution in ethanol of salicylic acid | 12 ml |
| methanol | 118 ml |

The recording material was dried and exposed reflectographically as described in Example 1.

A yellow image corresponding to the image markings of the original was formed.

The image was particularly suited for use in the projection with overhead projector.

We claim:
1. In a thermographic recording process in which a dye is produced by bringing image-wise into reactive contact with the aid of heat an organic acid-reacting compound with a dye precursor compound, the improvement of producing a light stable yellow image by bringing said compound into contact with a dye precursor corresponding to the following general formula:

$$X - Ar - CH = N - R_1$$

wherein:
Ar represents a phenylene nucleus,
$R_1$ represents a phenyl group and
X represents a

group wherein each of $R_2$ and $R_3$ (same or different) represents an alkyl group, a cyanoalkyl group, a chloroalkyl group, and an alkoxy carbonylaklyl group.

2. A thermographic recording process according to claim 1, wherein the dye precursor compound and acid-reacting compound are applied on separate support sheets and one of them is transferred by heat from its support into reactive contact with the compound on the other support sheet.

3. A thermographic recording process according to claim 2, wherein the dye precursor compound and acid-reacting compound are applied on separate support sheets and the acid-reacting compound being volatile or meltable at the temperature reached in the image-wise heating is transferred from a transfer sheet to a receptor sheet which contains the dye precursor compound to form therewith a dye.

4. A thermographic recording process according to claim 3, wherein the dye precursor compound is applied in a coating containing a non-acidic vinyl chloride polymer or copolymer.

5. A thermographic recording process according to claim 3, wherein the dye precursor compound is contained in a binder coating in a ratio of 1 part by weight with respect to 1 or 20 parts by weight of binder.

6. A thermographic recording process according to claim 1, wherein the dye precursor compound and acid-reacting compound are used in an integral copy-sheet containing on a same support the acid-reacting compound out of direct chemical contact from the dye precursor compound but in such condition that reactive contact can be effected through heating at a temperature above 60° C.

7. A thermographic recording process according to claim 6, wherein at least one of the reactants being the acid-reacting compound and dye precursor compound are kept out of direct chemical contact by enveloping at least one of the reactants in capsules or droplets from which the reactant is set free by image-wise heating the copy-sheet.

8. A thermographic recording process according to claim 7, wherein the capsules or droplets are dispersed in the paper mass of a paper sheet or in a binder or binder system containing the second reactant in dispersed or dissolved form.

9. A thermographic recording process according to claim 6, wherein the dye precursor compound and acid reactant are in separate binder layers and preventing chemical reactive contact at least below 60° C.

10. A thermographic recording process according to claim 9, wherein the top layer of the binder layers has been applied from a solution in a volatile liquid, which is a non-solvent for the binder of the subjacent other layer.

11. A thermographic recording process according to claim 10, wherein the dye precursor compound has been incorporated in a first layer on the support of the copy-sheet in a vinyl chloride homopolymer or copolymer binder and the acid-reacting compound has been applied on top of said first layer from a solution of a polymer in ethanol or methanol.

12. A thermographic recording process according to claim 11, wherein the integral copy sheet is a clear transparent heat-sensitive sheet material useful in the preparation of a colour projection transparency by thermographic copying procedures and includes a first layer containing the dye precursor compound in a vinyl chloride polymer binder and a second coating bonded to said first layer containing the compound reacting as an acid in a binder mainly containing cellulose nitrate.

* * * * *